US006630928B1

(12) United States Patent
McIntyre et al.

(10) Patent No.: US 6,630,928 B1
(45) Date of Patent: Oct. 7, 2003

(54) METHOD AND APPARATUS FOR TOUCH SCREEN DATA ENTRY

(75) Inventors: Keith Eric McIntyre, Roseville, CA (US); John Foxe Sheets, San Francisco, CA (US); Dominique Andre Jean Gougeon, Rocklin, CA (US); Curtis W. Watson, Aubrey, TX (US); Keven Paul Morlang, Fair Oaks, CA (US); Dave Faoro, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/410,873

(22) Filed: Oct. 1, 1999

(51) Int. Cl.[7] .......................... G09G 5/00; G06F 12/14; H04L 9/32
(52) U.S. Cl. .......................... 345/173; 380/52; 713/194
(58) Field of Search .................. 345/173; 382/124; 713/194; 705/1; 455/566; 380/24, 52; 709/203, 331

(56) References Cited

U.S. PATENT DOCUMENTS

| 5,420,936 A | * | 5/1995 | Fitzpatrick | 382/124 |
|---|---|---|---|---|
| 5,768,386 A | * | 6/1998 | Yokomoto et al. | 280/24 |
| 5,970,146 A | * | 10/1999 | McCall et al. | 380/24 |
| 6,016,476 A | * | 1/2000 | Maes et al. | 705/1 |
| 6,081,260 A | * | 6/2000 | Kuzunuki et al. | 345/173 |
| 6,141,688 A | * | 10/2000 | Bi et al. | 345/179 |
| 6,141,699 A | * | 10/2000 | Luzzi et al. | 709/331 |
| 6,192,258 B1 | * | 2/2001 | Kamada et al. | 455/566 |
| 6,199,100 B1 | * | 3/2001 | Filepp et al. | 709/203 |
| 6,225,983 B1 | * | 5/2001 | Katsurabayashi et al. | 345/173 |
| 6,262,718 B1 | * | 7/2001 | Findlay et al. | 345/173 |
| 6,285,358 B1 | * | 9/2001 | Roberts | 345/173 |
| 6,317,835 B1 | * | 11/2001 | Bilger et al. | 713/194 |
| 6,367,015 B1 | * | 4/2002 | Kubo et al. | 345/173 |

* cited by examiner

Primary Examiner—Bipin Shalwala
Assistant Examiner—David L. Lewis

(57) ABSTRACT

Data entry apparatus comprising a display screen device, a touch pad mounted over the display screen device, and an application processor coupled to the touch pad and to the display screen device. The application processor has an application program processing module and a touch pad controller module. The application program processing module displays on the display screen a predefined data entry screen having a prearranged set of functional components and sends to the touch pad controller module a hot spot command defining a plurality of touch pad hot spots corresponding in area and location to the set of functional components. The touch pad controller module senses a touch event on the touch pad corresponding to one of the touch pad hot spots and sends to the application processor a touch event message identifying the touch pad hot spot corresponding to the touch event. PIN entry commands are issued by the application processor module and processed in the touch pad controller for secure PIN entry on the touch screen.

14 Claims, 11 Drawing Sheets

METHOD AND APPARATUS FOR TOUCH SCREEN DATA ENTRY

FIELD OF THE INVENTION

This invention relates generally to security of data terminals which utilize touch screens for data entry. This invention also relates to secure terminal systems which utilize a security processor to control access to data entry on a touch screen.

BACKGROUND OF THE INVENTION

Touch screens for data entry on a computer terminal are well known in the art. A touch screen allows the user of a terminal to enter a menu selection or data by placing a finger or other object at a location on the display screen that corresponds to the menu item, function or data numeral to be entered. A touch sensitive element detects the coordinates of the touch event and the meaning of the touch event is determined by the coordinate location and the corresponding menu or data button displayed on the screen.

When a touch screen is utilized to enter data such as a secret PIN number, it is vital that the PIN number be protected by encryption prior to being communicated to any external resource. Entry of other data or menu selections on the same touch screen does not require encryption security. Accordingly, utilizing a touch screen for entry of both secret data and nonconfidential data presents a difficult technical challenge.

OBJECTS OF THIS INVENTION

It is a principal object of this invention to provide an improved method and apparatus for operating a touch screen device.

It is another object of this invention to provide a method and apparatus for operating a touch screen device in a manner which provides security for confidential data entry and high flexibility for entry of general and nonconfidential data.

It is another object of this invention to provide a method and apparatus having improved logical security for sensitive data items entered on a touch screen.

FEATURES AND ADVANTAGES OF THIS INVENTION

In its broadest aspect, this invention features a method for operating a touch screen device (e.g. a combination touch pad and display screen) which involves displaying on the display screen a set of functional components. An additional step involves defining a plurality of touch pad hot spots corresponding in area and location to the functional components. The method further involves sensing a touch event on the touch pad corresponding to one of the touch pad hot spots and creating a touch event message identifying the touch pad hot spot corresponding to the touch event.

The touch event message is not the coordinates of the touch event, but rather an identification of which of the defined hot spots corresponds to the touch event.

In this aspect of the method of this invention the touch pad is controlled by a touch pad controller and the display screen is controlled by an application processor in communication with the touch pad controller and the display screen. These can be separate hardware modules or separate software modules in the same processor with a built in firewall between them.

The application processor carries out the step of displaying on the display screen the set of functional components and the step of defining hot spots is is carried out by the application processor by sending to the touch pad controller a hot spot command defining a plurality of touch pad hot spots corresponding in area and location to the set of functional components. The sensing step is carried out by the touch pad controller sensing a touch event on the touch pad corresponding to one of the touch pad hot spots and sending to the application processor a touch event message identifying the touch pad hot spot corresponding to the touch event. The touch event message is not the touch coordinates but rather an identification of the hot spot associated with the touch coordinates.

A variation of the invention features described in the preceding paragraph involves a method for operating a combination touch pad and display screen device as a secured data entry device in a point-of-sale transaction environment in which secret PIN entries are required. In this variation, the touch pad controller has an associated security processor and is located within a security module for protection against physical intrusion. The application processor displays on the display screen device a PIN data entry screen comprising at least a set of data entry buttons corresponding to PIN numerals and an "ENTERS" command button. In addition, the application processor sends to the touch pad controller a PIN data entry command requesting execution of a PIN entry touch event routine.

The touch pad controller responds to the PIN data entry command by defining a prearranged set of hot spots corresponding to active data entry and command buttons in the PIN data entry screen, then responding to a sequence of touch events corresponding to active data entry buttons by storing each of the associated PIN numerals, and finally by responding to a touch event corresponding to the "ENTER" command button by encrypting the stored PIN numerals using the security processor and sending the encrypted PIN data to the application processor.

In this secured data entry application of this invention, the touch pad hot spots associated with entry of general, non-confidential data items are defined by the application processor whereas the touch pad hot spots associated with entry of confidential data items are predefined in touch pad controller itself to correlate with the data entry screen display set up by the application processor. In the former case, each touch event is returned to the application processor as an indication of one of the defined hot spot corresponding to the location of the touch event. In the latter case, each touch event is echoed in some fashion to the application processor, but the actual secret numerical data elements are stored in the touch pad controller and then encrypted in the security chip before being sent to the application processor.

In this secured data entry application, the invention preferably includes additional features which preclude hot spot definition commands from setting up a number and arrangement of hot spots that would permit entry of confidential data items without encryption. To achieve this the method of this invention further involves the touch pad controller determining if the number of hot spots defined in the data entry command is less than or equal to a predetermined hot spot limit less than the number of hot spots required for PIN entry. If the result of this step is positive, the touch pad controller directly executes the data entry command by responding to hot spot touch events and sending corresponding touch event messages to the application processor. If too many hot spots are defined, the touch pad controller declares a hot spot command error and processes a hot spot error routine.

Alternatively, the touch pad controller limits the number of touch events and touch event messages returned to a number less than that required for confidential data entry.

Instead of declaring a hot spot command error, this invention may include the feature of allowing the touch pad controller to execute a data entry command with more hot spots than the limit number if the data entry command includes one or more authentication parameters that permit the touch pad controller to authenticate the command before executing it. Such command authentication parameters would be added to data entry commands by a trusted agent after audit of the program routines to ensure that they didn't violate data entry security protocols.

The use of command authentication parameters in accordance with this invention provided complete flexibility in use of hot spots for data entry routines without compromising security during entry of confidential data items.

Another variation of the method of this invention involves permitting the application processor to define a number of hot spots sufficient for entry of a PIN number, but to provide that the touch pad controller will limit the number of touch events returned during the processing of a single hot spot command to a number fewer than a minimum number of digits in a PIN code. This feature provides additional flexibility in use of hot spots for data entry or entry of menu items.

The use of hot spots under the control of the touch pad controller with its associated security chip as an aspect of data entry separate from the data screen content defined by the application processor provides the advantage of secure but flexible data entry via a single data entry resource.

Another variation of the broadest aspect of this invention described above is one in which the touch pad and the display screen are both controlled by an application processor comprising a touch pad controller module for controlling the touch pad and an application program processing module for executing application program commands including commands for displaying functional components on the display screen. The displaying step is carried out by the application program processing module displaying on the display screen a set of functional components.

The hot spot defining step is carried out by the application program processing module sending to the touch pad controller module a hot spot command defining a plurality of touch pad hot spots corresponding in area and location to the set of functional components. The touch event processing step is carried out by the touch pad controller module sensing a touch event on the touch pad corresponding to one of the touch pad hot spots and sending to the application program processing module a touch event message identifying the touch pad hot spot corresponding to the touch event.

By separating out the touch pad controller module of the application program processing, the logical security provided by hot spots for PIN entry and entry of other confidential data is preserved. The subsidiary method features discussed above are retained and that discussion need not be repeated here. Details will be clear from the description of invention embodiments provided below.

This invention also features data entry apparatus which comprises the combination of a display screen device, a touch pad mounted over the display screen device, a touch pad controller coupled to the touch pad; and an application processor coupled to the touch pad controller and to the display screen device. The application processor comprises means for displaying on the display screen a predefined data entry screen having a prearranged set of functional components and means for sending to the touch pad controller a hot spot command defining a plurality of touch pad hot spots corresponding in area and location to the set of functional components. The touch pad controller comprises means for sensing a touch event on the touch pad corresponding to one of the touch pad hot spots, and means for sending to the application processor a touch event message identifying the touch pad hot spot corresponding to the touch event.

The apparatus may further feature a security processor associated with the touch pad controller to enable secure PIN entry by carrying out the PIN entry command feature as discussed above relating to method features. Similarly, additional apparatus features can be employed to carry out other method features previously discussed.

A variation of such a data entry apparatus of this invention comprises the combination of a display screen device; a touch pad mounted over the display screen device; and an application processor coupled to the touch pad and to the display screen device. The application processor comprises separate application program processing module and touch pad controller module. The application program processing module includes means for displaying on the display screen a predefined data entry screen having a prearranged set of functional components; and means for sending to the touch pad controller module a hot spot command defining a plurality of touch pad hot spots corresponding in area and location to the set of functional components. The touch pad controller module includes means for sensing a touch event on the touch pad corresponding to one of the touch pad hot spots; and means for sending to the application processor a touch event message identifying the touch pad hot spot corresponding to the touch event.

In this variation, the functions of touch pad control and related security are carried out in the separate touch pad controller module of the application processor to achieve somewhat the same degree of logical security via the use of hot spots. Similar methodology of PIN entry and the limiting of defined hot spots by other application program commands may be carried out in this apparatus environment.

The use of defined hot spots according to this invention and the limitation on defined hot spots (except for authenticated commands as will be discussed below) provides for effective filtering of touch pad accesses in both high, medium and light security environments. Use of this invention in programmable terminals provides for assurance that security will not be compromised by allowing applications with unknown features to be loaded into the terminal.

Other objects, features and advantages of this invention will be apparent from a consideration of the following detailed description taken in conjunction with the accompanying drawings.

BRIEF DESCRIPTION OF DRAWING FIGURES

FIG. 1 is a plan view of a portable transaction terminal in which the features of this invention may be utilized.

FIGS. 1A, 2, 3, 7, and 8 are pictorial diagrams of elements of one embodiment of the apparatus of this invention and illustrating certain aspects of the method of this invention.

DETAILED DESCRIPTION OF INVENTION EMBODIMENTS

Figure 1:
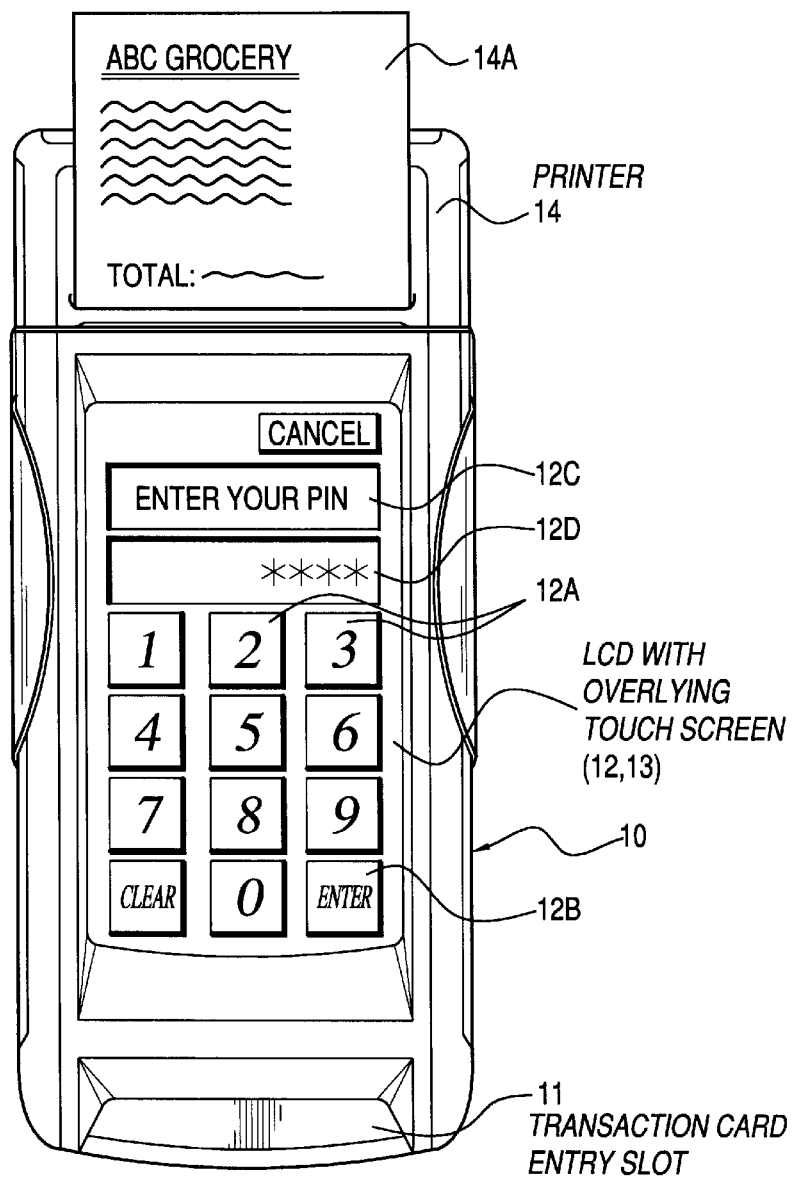

Referring now to FIGS. 1, 1A, 2A–2D and 3, the elements of the method and apparatus of this invention will be discussed in various embodiments. From a method standpoint, this invention involves operating a combination of a touch pad 13 and a display screen 12 (preferably a liquid crystal display) for data entry or other user interface functions. Touch pad 13 is coupled to and controlled by touch pad controller 16 which is part of an overall security processor module 50. Display screen 12 is coupled to and controlled by an application processor 15 which is the main processor in the device. Application processor 15 is in communication with touch pad controller 16.

According to this embodiment of this invention, application processor 15 displays on display screen 12 a set of functional components 12B which may comprise, for example, a data entry screen or menu having a prearranged set of discretely labeled data entry and/or function buttons. However, it should be understood that any form of static or dynamic set of functional components could be presented on display screen 12.

Application processor 15 sends to touch pad controller 16 a data entry command defining a plurality of touch pad hot spots 13A corresponding in area and location to the set of functional components 12A. Touch pad controller 16 senses a touch event on touch pad 13 corresponding to one of the touch pad hot spots 12A and sends back to application processor 15 a touch event message identifying the touch pad hot spot corresponding to the touch event.

As is well known, touch pad 13 registers the x,y coordinates of a touch. Touch pad controller 16 is programmed to receive this x,y coordinate data and determine if the coordinates of the touch correspond to a defined hot spot region. If so, the touch is considered a touch event and touch pad controller 16 sends to application processor 15 a message which identifies which of the defined hot spots corresponds to the touch event. If the touch coordinates received by touch pad controller 16 are outside all of the defined hot spot areas, touch pad controller 16 discards or disregards this input and no message is sent back to application processor 15.

By employing this approach, touch pad controller 16 is in full control of touch pad 13 and can be utilized to operate touch pad 13 in a secure manner in the many point-of-sale applications that require security for PIN entry and other data entry routines.

Figure 1A:
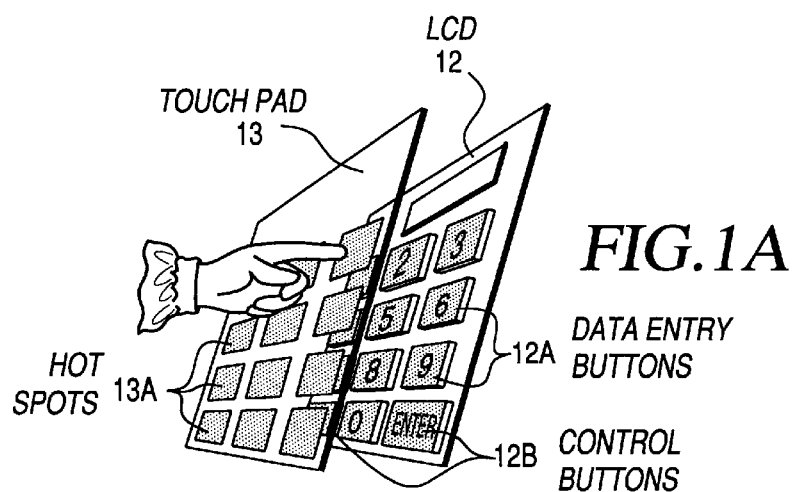
Figure 3:
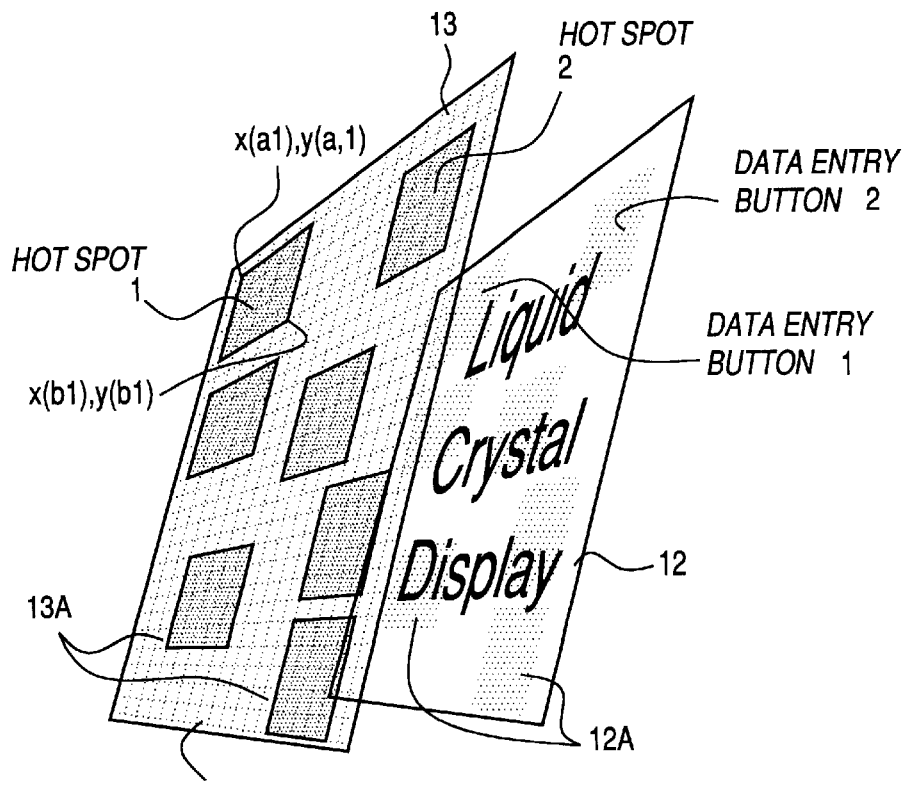
FIG. 3 is a pictorial diagram useful for illustrating a portion of this invention.

FIGS. 1 and 1A illustrate a set of functional components in the form of data entry and function buttons of a numeric keypad for PIN entry. FIG. 3 illustrates a more general arrangements of functional components 12A and corresponding hot spots 13A. FIG. 3 also illustrates one method of defining the location of hot spots 13A in a data entry command sent from application processor 15 to touch pad controller 16. In this case hot spots 13A are restricted to be rectangular regions on touch pad 13 and location and size of each rectangular hot spot 13A is defined by the coordinates of the upper left corner and the lower right corner of the hot spot rectangle.

Figure 8:
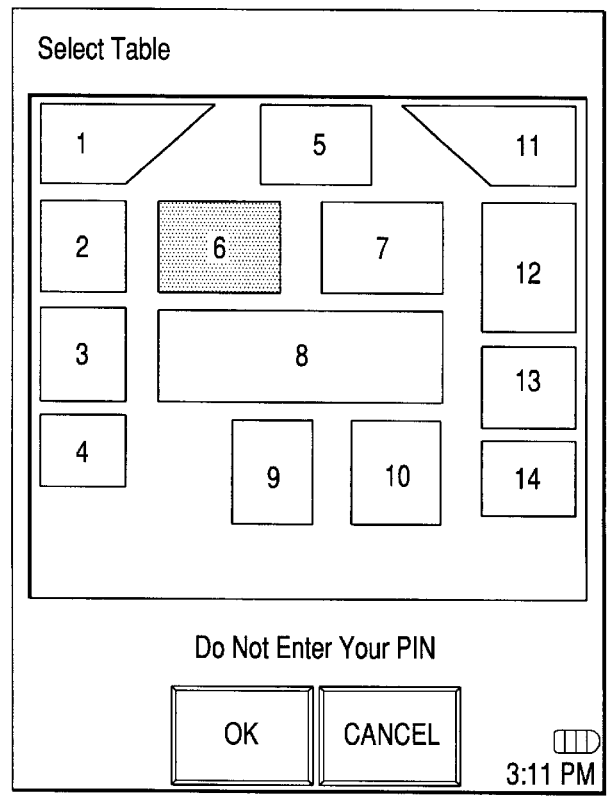

It should be understood that this invention is not restricted to the use of rectangular data entry buttons 12A and rectangular hot spots 13A. FIG. 8 illustrates that irregular geometric shapes for functional components and corresponding hot spots could be utilized. Any closed geometric shape can be used with appropriate adaptation of the data entry command to define the location and size and geometric configuration of each hot spot.

One of the important applications of the method and apparatus of this invention is the operation of touch pad 13 and display screen 12 as a secured data entry device in a point-of-sale transaction environment in which secret PIN entries are required, as illustrated in FIGS. 1, 1A and 2A. In this POS environment, touch pad controller 16 has an associated security processor or security chip 17 and is located within a security module 50 for protection against attempts at physical intrusion. Security modules for detection of and protection against physical intrusion are well known and thus need not be discussed here.

This particular form of apparatus represents one hardware environment for the practice of this invention. Others will be described later.

In the POS transaction environment, to accomplish a PIN entry step, application processor 15 displays on display screen 12 a PIN data entry screen comprising a set of data entry buttons corresponding to PIN numerals and an "ENTER" command button. Other command buttons such as "CANCEL" and "CLEAR" may also be provided. Application processor 15 sends to touch pad controller 16 a predefined PIN data entry command requesting execution of a PIN entry touch event routine.

Touch pad controller 16 is preprogrammed with such a PIN entry touch event routine in which hot spots 13A are predefined to correspond to numeral buttons of a numeric keypad on the PIN data entry screen as well as to command buttons thereon. This PIN entry touch event routine also enables touch pad controller 16 to respond to a sequence of touch events corresponding to active data entry buttons by storing each of the associated PIN numerals in an internal data memory location and then respond to a touch event corresponding to the "ENTER" command button by encrypting the stored PIN numerals using security processor 17 and then sending the encrypted PIN data to application processor 15. An example of specific software program steps for carrying out this PIN entry touch routine will be discussed hereafter in connection with FIGS. 5 and 6.

It should thus be apparent that the PIN entry function involves a different approach from operation of display screen 12 and touch pad 13 as a general data entry device as previously described. In the general data entry case, each touch event results in a corresponding data item being returned to the main processor in the clear, i.e. unencrypted. In the PIN entry case, all touch events are signaled to application processor 15 in some fashion, but touch event information relating to the PIN numerals is stored in touch pad controller 16 and then encrypted before sending it to the main processor. These differences will be discussed in more detail below.

In accordance with this invention, touch pad controller 16 is provided with another program feature to prevent an application program module running in application processor 15 from improperly obtaining PIN data in the clear, i.e. unencrypted. This feature involves limiting the number of hot spots that an application program command can effectively communicate to touch pad controller 16. Touch pad controller 16 determines if the number of hot spots defined in the data entry command is less than or equal to a predetermined hot spot limit.

This hot spot limit is selected to be less than the number of hot spots required for PIN entry. Touch pad controller 16 will execute the data entry command if the number of defined hot spots meets the hot spot limit test or else declare a hot spot command error which prevents further execution of commands until the hot spot error is cleared.

Such a rigid limitation on the number of hot spots 13A that may be declared by a data entry command may be too limiting in certain applications. For example, it would preclude a restaurant terminal application with a table number entry screen such as shown in FIG. 8 since the number of hot spots is greater than the number required for PIN entry. The hot spot limit could be avoided in such an application by using two or more separate screens to display the tables at different locations, but scrolling through two or more screens to enter a single data item may be too unattractive to the customer.

As an alternative, touch pad controller 16 may be programmed to permit a data entry command to define a number of hot spots greater than the hot spot limit if the command passes certain authentication tests. Command authentication can be performed in a variety of ways, including for example, a secured commands system and method as taught in PCT application PCT/US96/11837, filed Jul. 26, 1996, and entitled: METHOD AND APPARATUS FOR OPERATING SECURED RESOURCES UNDER CONTROL OF SECURITY MODULE. The disclosure of this PCT application is hereby incorporated by reference. Command authentication schemes inherently involve auditing of the application program by a trusted party to make certain that the data entry commands in the program do not violate security protocols relating to entry of sensitive information such as PIN codes.

If a data entry command that defines a number of hot spots over the hot spot limit fails to pass command authentication tests, then a hot spot error is declared and a hot spot error routine is executed by touch pad controller 16. A hot spot error routine may involve one of several approaches. In one case, the routine involves defining a prearranged set of hot spots at locations which are known only to service personnel. These hot spots and an associated error clearing routine in touch pad controller 16 may be used by service personnel to clear the error and return the terminal to regular processing.

If a higher degree of security is required, a hot spot error routine may involve erasure of encryption keys and other information in the security module. This feature would require the terminal to be returned to the manufacturer for reloading of encryption keys before it could be put back into service.

Figure 2:
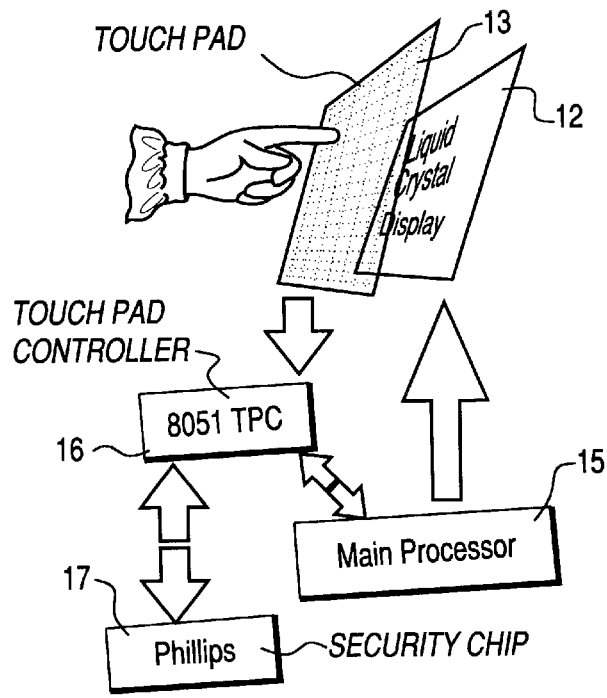
FIGS. 2B–2D illustrate alternative types of apparatus in accordance with this invention and which utilize the method of this invention.
Figure 2B:
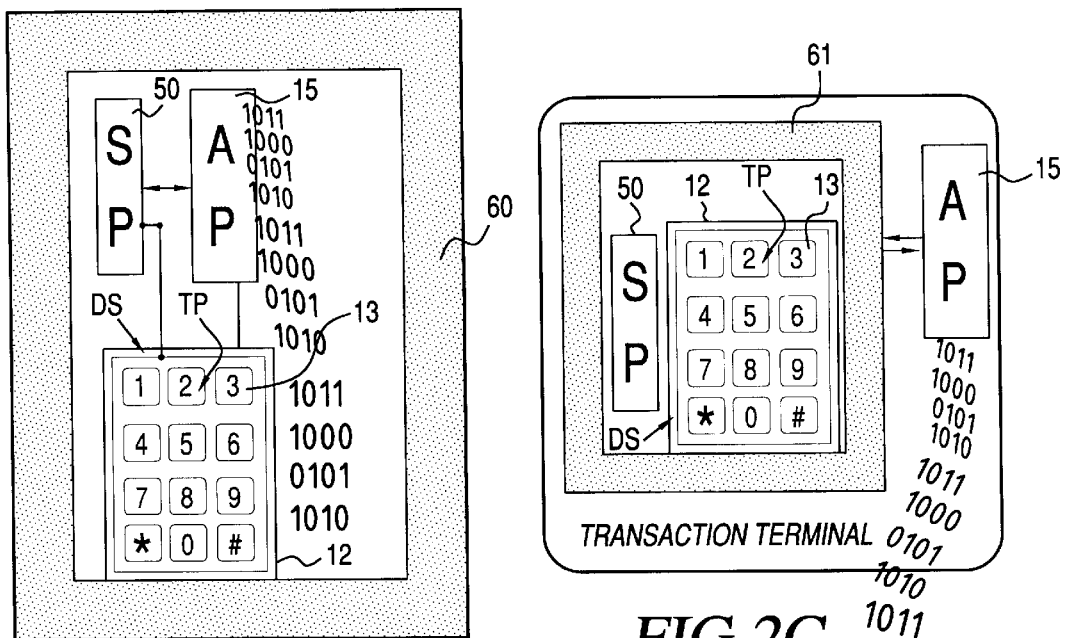
Figure 2C:
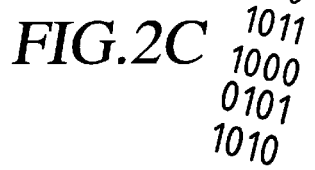
Figure 2D:
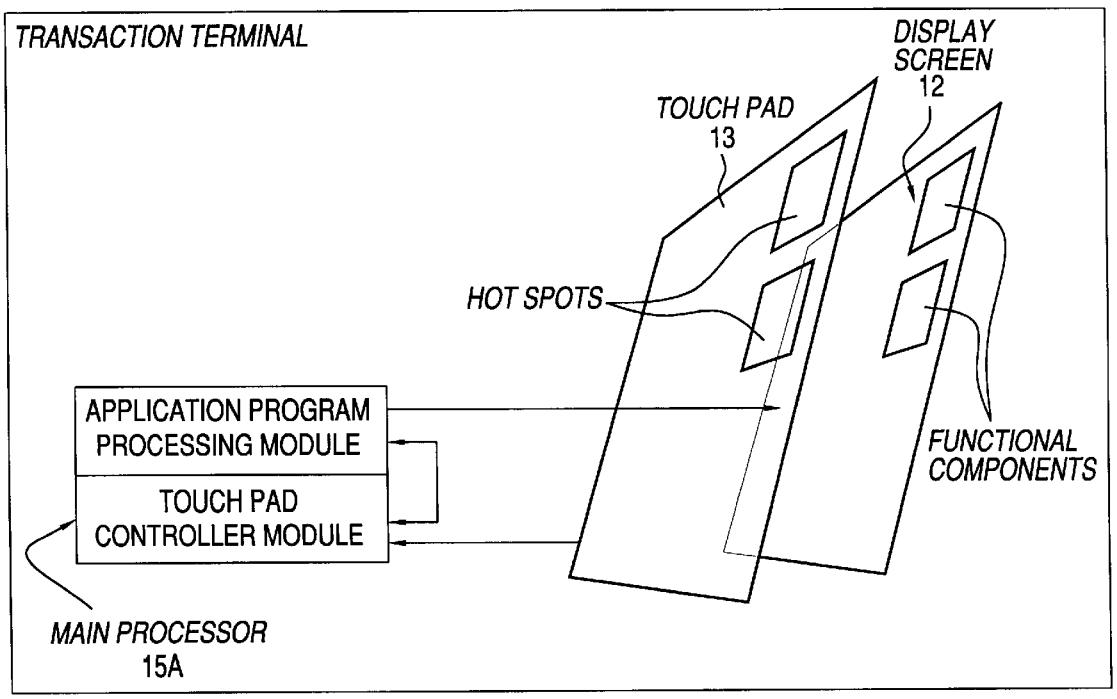

FIGS. 2B, 2C, and 2D illustrate the various levels of physical security in which the logical security features provided by the hot spots of this invention may be utilized. FIG. 2B illustrates a high security environment. Solid brick wall 60 represents electrical and mechanical security measures and barriers which provide physical and logical security for the system inside the barriers. Those measures and barriers could consist of literal bricks and mortar, steel plate, micro switches to detect entry, and one or more sensors or any number of other physical security barriers that stop an attacker from tampering with sensitive electronics, programming, data or money.

Touch pad (TP) 13 is used to receive input from a user. In this case it is illustrated by a telephone layout style of numeric keypad on display screen 12 and touch pad 13. Secure processor (SP) 50 interfaces with touch pad 13 and may be used to encrypt information entered on the touchpad. An application processor (AP) 15 executes application programs (represented by the binary digits 0 and 1). In this example all of the components (TP, SP, AP and application program) are protected by physical security measures. Hot spots in accordance with this invention could be employed to add a level of logical security in this protected environment. This logical security measure stops a rogue application program from getting sensitive information entered on touch pad 13. TP. In this design, the software implementing the hot spot capability may reside in the SP or the AP or the functionality and implementation may be spread across both secure secure processor 50 and application processor 15.

Hot spots may be considered redundant in such an environment as FIG. 2B because the physical security is thought impervious to insertion of rogue applications. This type of physical security makes sense for bank ATM machines as an example. In the case of smaller devices such as desktop or handheld transaction terminals, physical security such as this is too bulky and expensive to be practicable.

FIG. 2 illustrates a common approach in transaction terminals that involves placing physical security barriers around the most sensitive parts of the terminal, in this case display screen 12, touch pad 13, and security processor 50. Application processor 15 is usually not protected by the same security measures so that the terminal application itself can be downloaded into the terminal by one or more means. This approach has the advantage of of reduced cost, improved manufacturability and reduced terminal size.

However, this terminal design increases vulnerability to attacks by rogue applications. Hot spots in accordance with this invention provide a logical security barrier to misuse of the touch pad by rogue applications to obtain confidential data such as a customer PIN. Since the application and the application processor are not allowed to access the touch pad directly, but instead must go through the security processor, hot spots act as a powerful "filter" that allows only legitimate interactions between the application program and the touch pad. The hot spot features are preferably implemented in security processor 50 and application processor 15 in this embodiment.

FIG. 2D illustrates another embodiment in which hot spots can be used to provide an effective logical security barrier. Minimal physical security measures are taken to protect the terminal from attacks. This embodiment does not employ a security processor so the application processor has direct control over the Touch Pad. In most situations this would allow the application program to have free access the touch pad and display device and thus could collect sensitive information from users in the clear (i.e. unencrypted). Rogue applications might then obtain a customer's PIN. The hot spots feature of this invention provides an effective security barrier between the touch pad 13 and the application program running in the application program processing module of main processor 15A. The application program still has touch pad accesses filtered by the hot spot software resident in a touch pad controller software module in the application processor. In such a light security environment, the hot spots feature in accordance with this invention provides sufficient security in at least some applications to allow unknown application programs to be downloaded into the terminal and executed.

Figure 4:
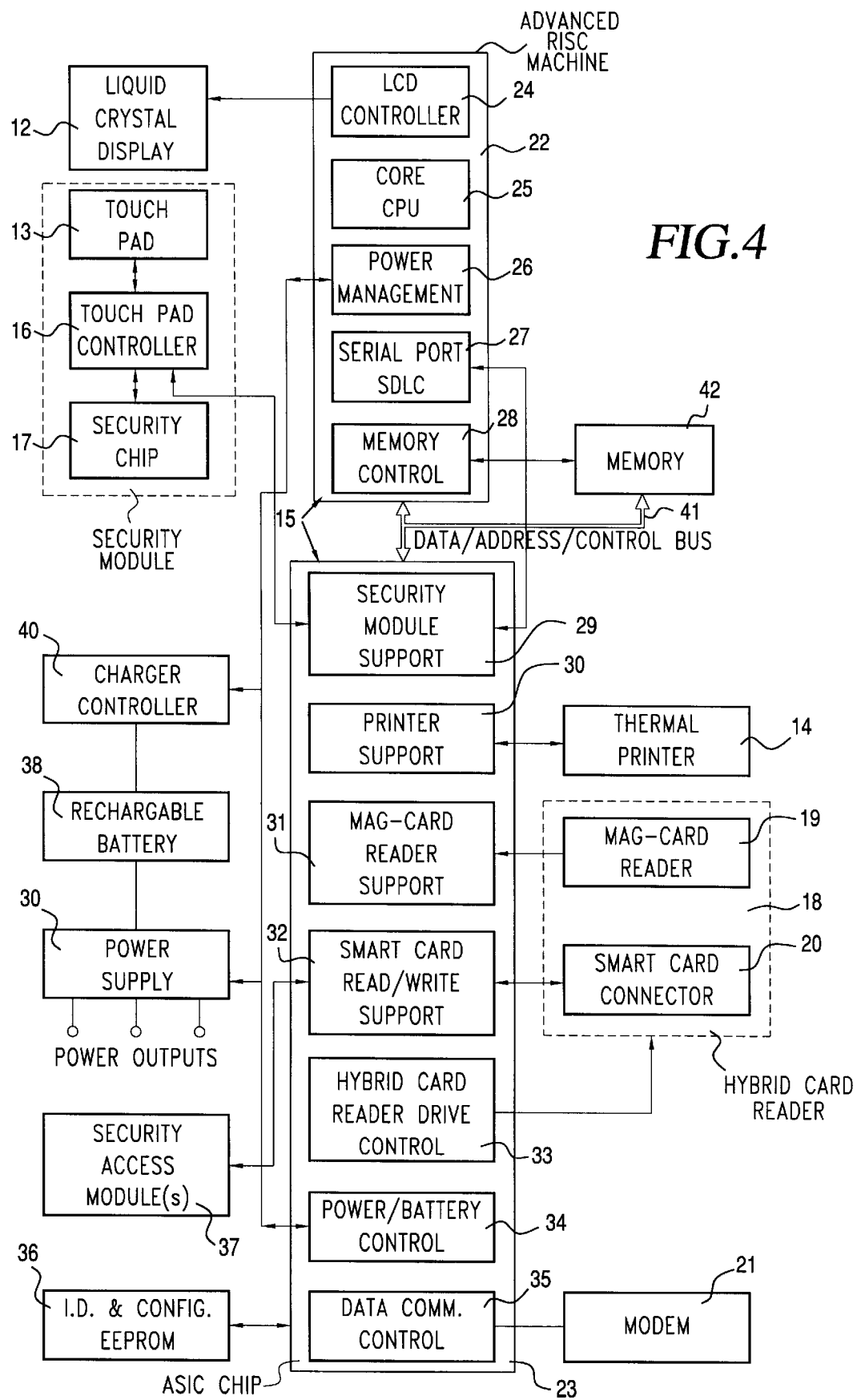
FIG. 4 is a block schematic diagram of a portable transaction terminal in which the features of this invention may be utilized.

FIG. 4 shows the details of one specific hardware environment in which the method and apparatus of this invention may be deployed. Touch pad 13, touch pad controller 16 and security chip 17 are provided within a security module 50 with features to detect physical intrusion. Touch pad 13 overlies LCD panel 12. LCD panel 12 preferably includes an LED backlight and may also include a heater for use in low temperature environments.

In this system, application processor 15 comprises a combination of an advanced RISC (reduced instruction set computer) machine 22 and an ASIC (application specific integrated circuit) chip 23.

RISC chip 22 includes a number of functional modules, some of which are shown in FIG. 4, namely LCD controller 24 to communicate with and control LCD 12, a core CPU 25, power management 26, a SDLC serial port 27, and memory control 28. Data/address/control bus 41 interfaces RISC chip 22 with external memory 42 and ASIC 23.

Power management block 26 in RISC chip 22 communicates with a power/battery control block in ASIC 23 and with power supply elements such as rechargeable battery 38, power supply 39, and charger controller 40. Power supply 39 provides the various power supply voltages required by the circuitry of the terminal system.

ASIC 23 includes a security module support block 29 which communicates with touch pad controller 16. Printer support block 30 controls the operation of thermal printer 14. Mag-card reader support block 31 processes signals from a mag-card reader 19 within hybrid card reader 18. Smart card read/write support block 32 communicates with smart card connector 20 within hybrid card reader 18 and with one or more security access modules (SAMs) 37. Hybrid card reader drive control block 33 controls the electromechanical drive elements, sensors and other operating elements involved in hybrid card reader 18. Data communications control block 35 controls operation of a modem 21 or other data communication apparatus. An ID and configuration EEPROM 36 is coupled to ASIC 23 and stores terminal identification data and application program configuration data. All of these functional blocks are well known in the art and thus details of structure and operation thereof need not be provided here.

Figure 5A:
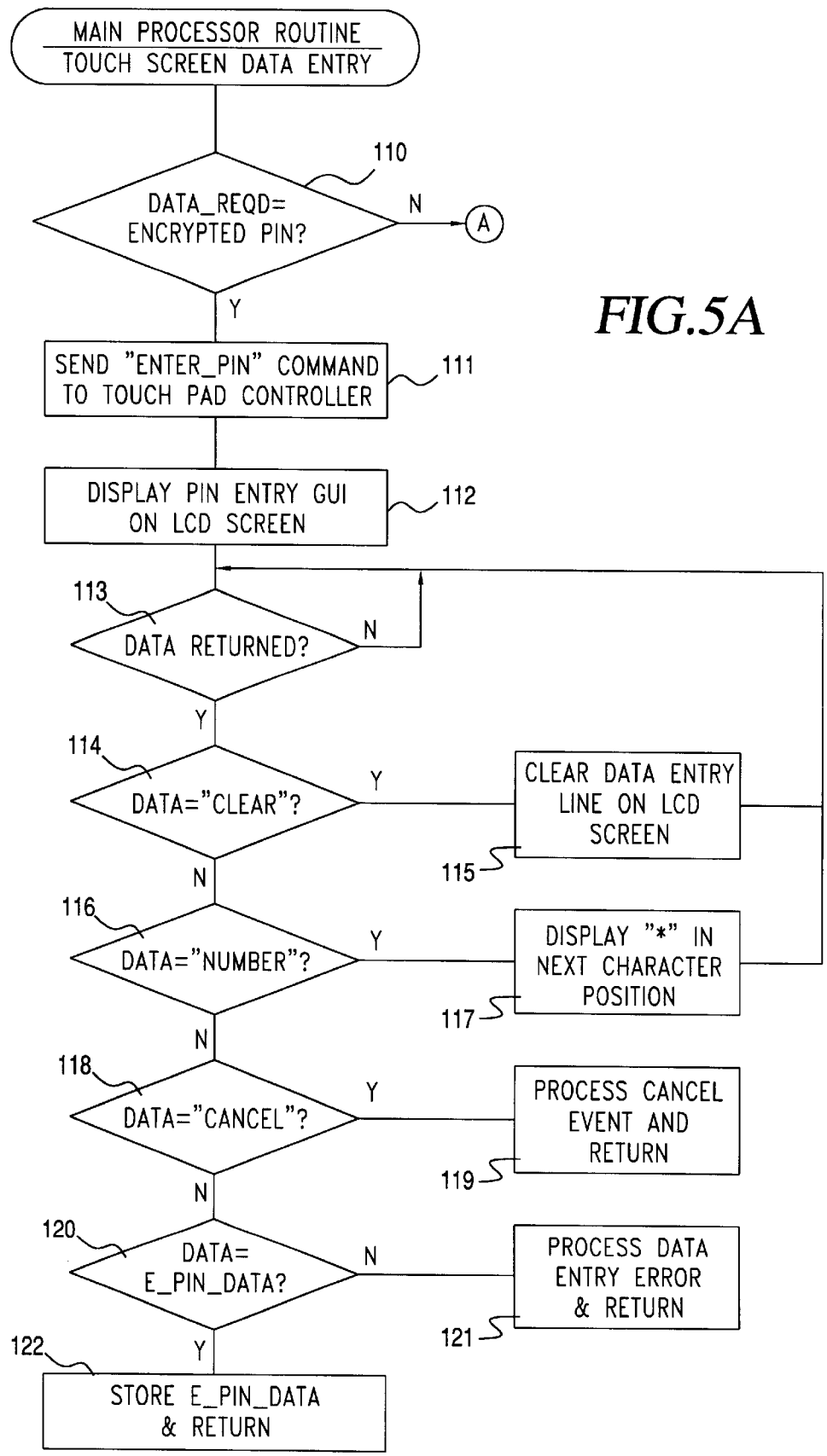
FIGS. 5A, 5B, 5C, 6A, 6B and 6C are software flow charts illustrating embodiments of the method of this invention.
Figure 5B:
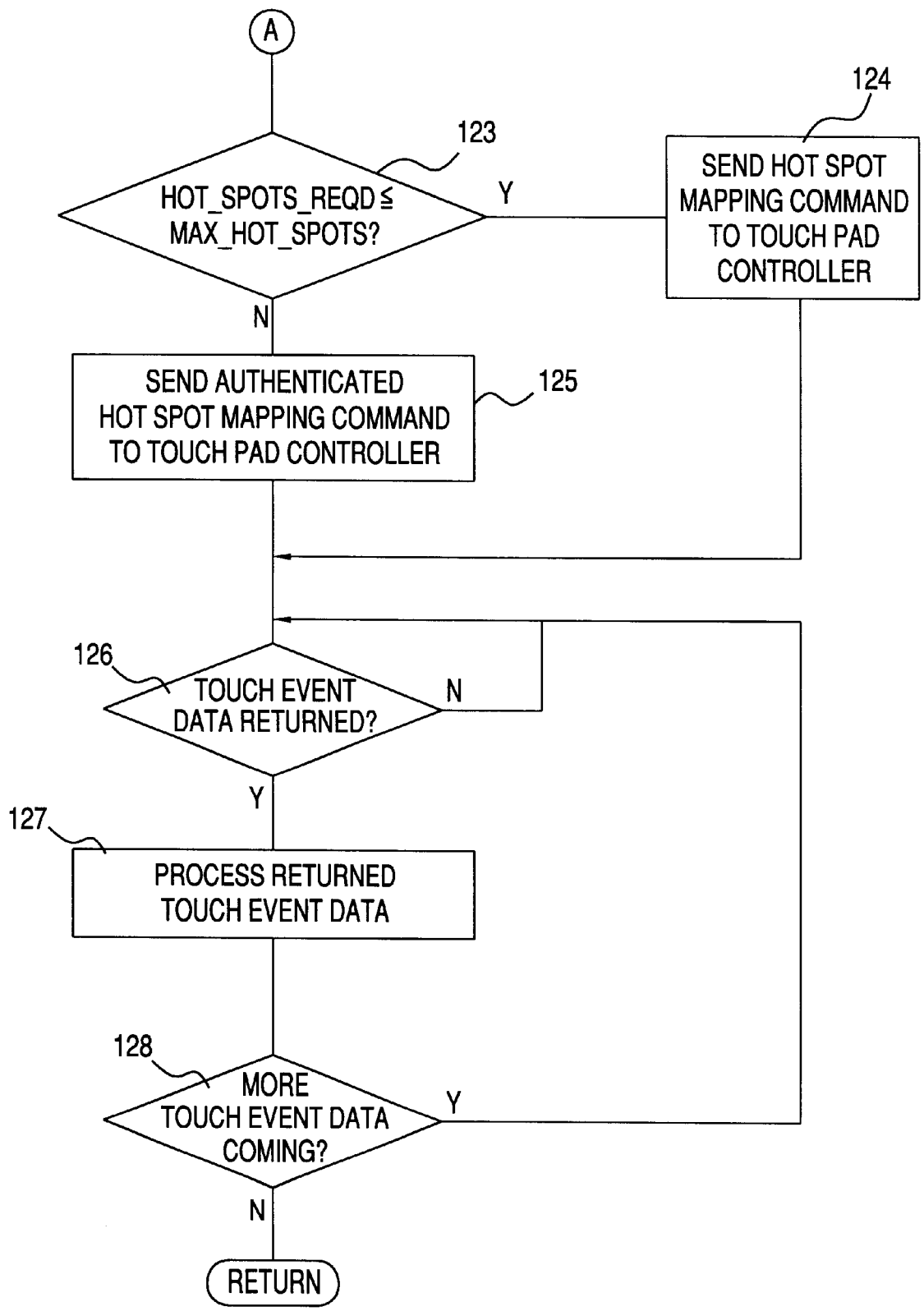

Referring now to FIGS. 5A and 5B, together with FIGS. 6A and 6B, one embodiment of software routines for touch screen data entry running in the main processor, i.e. application processor 15, and touch pad controller 16, will be discussed. Reference to FIG. 1 will also be useful in understanding the steps of these software routines. In the case of the hardware embodiment of FIG. 2D, the "main processor routine" illustrated in FIGS. 5A and 5B would run in the application program processing module, while the "touch pad controller" routine illustrated in FIGS. 6A and 6B would run in the touch pad controller module of main processor 15A.

PIN ENTRY

The program steps involved in PIN entry will be discussed first. Referring to FIG. 5A and a main processor routine designated "TOUCH SCREEN DATA ENTRY", checking step 110 determines if the data required is an encrypted PIN. If YES, application processor (main processor) 15 sends an ENTER_PIN command to touch pad controller 16 in step 111. Step 112 is executed to display a PIN entry GUI on LCD 12 and checking step 113 checks for return of data from touch pad controller 16.

Figure 6A:
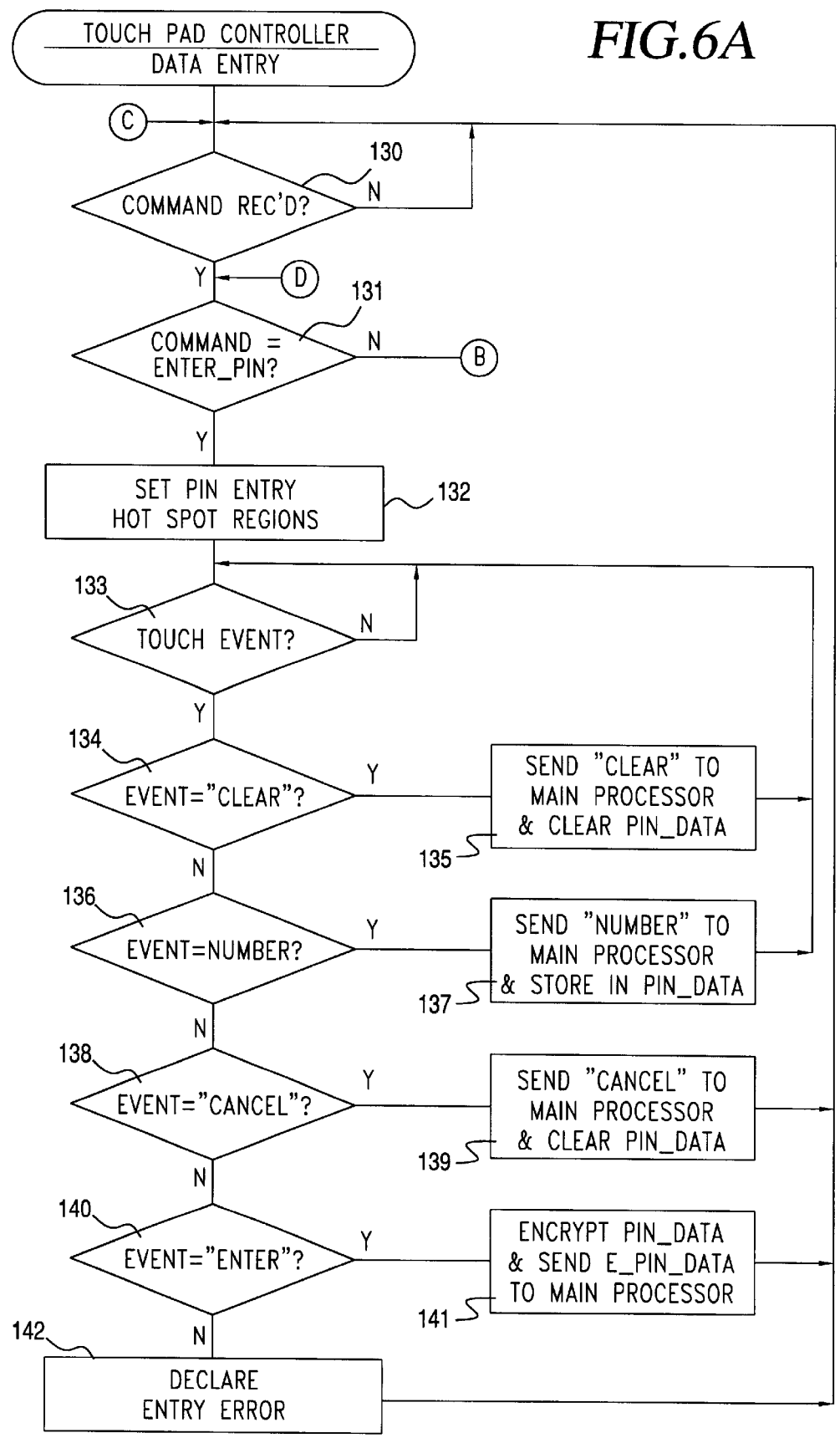

Now refer to FIG. 6A, and a "DATA ENTRY" routine in touch pad controller 16. Checking step 130 tests for receipt of a command from application processor 15, and if YES, checking step 131 determines whether the command is an ENTER_PIN command. If YES, step 132 is executed to set the PIN entry hotspot regions, generally as illustrated in FIG. 1A. Checking step 133 checks for occurrence of a touch event, and when that step returns YES, checking steps 134, 136, 138, and 140 check which of the hot spots correspond to the touch event followed by an appropriate program action.

If the touch event is CLEAR, meaning that the user touched touch pad 13 shown in FIG. 1 at the CLEAR button in the lower left, this means that the user wants to clear any prior entered data and start over with entering the PIN data. So, if checking step 134 returns YES, touch pad controller 16 sends a "CLEAR" data message to application processor 15 and clears any previously entered numerals stored in its PIN_DATA register. Referring to the corresponding action in application processor 15 as shown in FIG. 5A, checking step 114 detects that the returned data message is "CLEAR" and clears the data entry line 12D shown in FIG. 1 of any asterisks representing previously entered numerals of the PIN.

If the touch event is not "CLEAR", checking step 134 returns NO, and checking step 136 executes to determine if the touch event is a number or numeral, i.e. whether the user has touched one of the numeral buttons 0–9 shown in FIG. 1. If YES, touch pad controller 16 send a "NUMBER" message to application processor 15 and stores the corresponding numeral in its PIN_DATA register. The "NUMBER" message is not the numeral entered, but a message to application processor 15 that indicates that touch pad controller 16 has detected entry of a PIN numeral. Referring to checking step 116 in FIG. 5A, when the data message from touch pad controller 16 to application processor 15 is "NUMBER", step 117 is executed to display an asterisk "*" in the next character position in data entry line 12D shown in FIG. 1.

If the touch event is not "CLEAR" or "NUMBER", checking step 138 is executed to determine if the event is "CANCEL". This checking step will return YES if the user has touched the CANCEL button in the top right of touch pad 13 as shown in FIG. 1. This means that the user wishes to cancel PIN entry altogether. If checking step 138 returns YES, step 139 is executed, and touch pad controller 16 sends a "CANCEL" message to main processor 15 and clears its PIN_DATA register. Referring to FIG. 5A, checking step 118 will detect that the data message is "CANCEL" and application processor 15 will execute step 119 to process a cancel event and then return to start executing another program module.

If the touch event is not "CLEAR" or "NUMBER" or "CANCEL", checking step 140 is executed to determine if it is an "ENTER" event as a result of the user touching the ENTER button 12B (FIG. 1). If YES, step 141 is executed and the contents of PIN_DATA register is encrypted in security chip 17 and the resultant E_PIN_DATA is sent to main processor 15. Referring to FIG. 5A, checking step 120 detects if the data from main processor 15 is E_PIN_DATA, and if YES, the E_PIN_DATA is stored and the program execution returns to another program module.

If the routine in FIG. 6A reaches step 142, a data entry error of some type as occurred and is declared and an ERROR is sent to main processor 15. If checking step 120 in FIG. 5A returns NO, then the data returned can only be "ERROR" and a data entry error is processed in step 121.

The normal sequence of PIN entry will be the user touching a sequence of numeral buttons 0–9 on touch pad 13, resulting in the loading of corresponding numerals into the PIN_DATA register (steps 136, 137 in FIG. 6A) and echoing of the numerals to the data entry line 12D as asterisks. (steps 116, 117 in FIG. 5A). This would be followed by touching the ENTER button 12B, resulting in encryption of the PIN data in the PIN_DATA register and sending of E_PIN_DATA from touch pad controller 16 to main processor 15 (steps 140, 141 in FIG. 6A; steps 120, 122 in FIG. 5A).

OTHER DATA ENTRY

Referring to checking step 110 in FIG. 5A, if NO is returned because the data required is not a PIN entry, the routine in FIG. 5B is executed. Checking step 123 determines if the number of hot spots 13A required is less than or equal to the predetermined MAX_HOT_SPOTS parameter. If YES, then a hot spot mapping command is sent to touch pad controller 16 in step 124. If NO, then an authenticated hot spot mapping command is set to touch pad controller 16 in step 125. The routine then waits for touch event data to be returned (checking step 126), returned data is processed in step 127 and checking step 128 determines if more touch event data is coming.

Figure 6B:
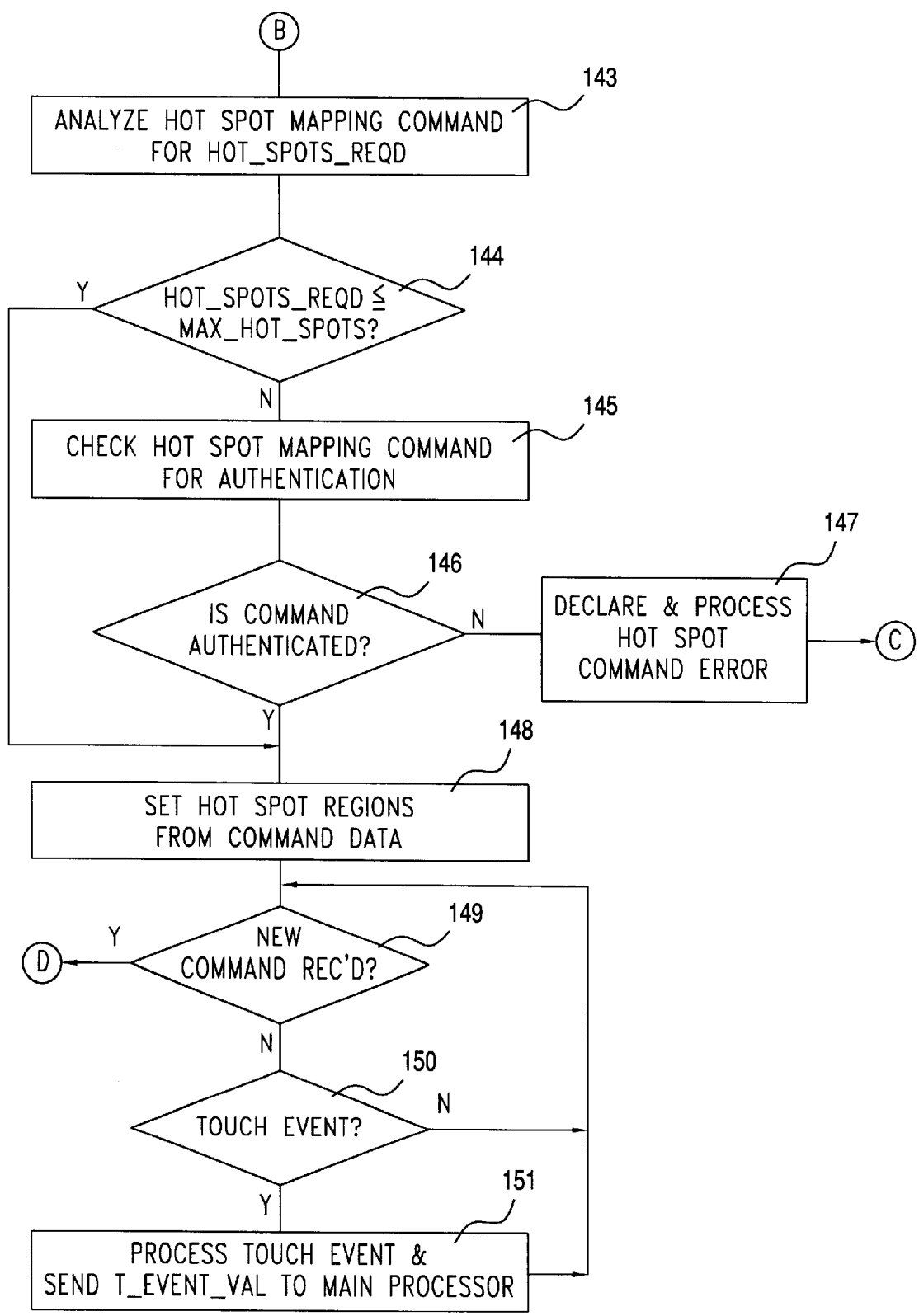

As shown in FIG. 6A, if the command from main processor 15 is not an ENTER_PIN command, then the steps in FIG. 6B are executed by touch pad controller 16. The hot spot mapping command is analyzed in step 143 to determine how many hot spots 13A are required. Checking step 144 determines if the number of hot spots required is less than or equal to the predefined maximum number and if YES, step 148 is executed to set the hot spot regions on touch pad 13 from the command data. If checking step 144 returns NO, step 145 is executed to check the authenticity of the hot spot mapping command, followed by checking step 146, so that a hot spot command error is declared in step 147 if the command is not authenticated or else step 148 is executed.

Checking step 149 determines if a new command is received, and if YES, then execution moves back to step 131 in FIG. 6A. If NO, then checking step 150 checks for occurrence of a touch event, and if YES, then step 151 is executed to process the touch event and sent T_EVENT_VAL back to the main processor 15. The content of T_EVENT_VAL is not the coordinates of the touch event, but an identification of which of the hot spots defined in the hot spot mapping command corresponds to the detected touch event. After each touch event is processed in step 151, the routine goes back to check for a new command in checking step 149 or another touch event in checking step 150.

Hots spots remain defined as in the last mapping command from main processor 15 until a new command is received to change the mapping.

COMMAND ERROR PROCESSING

Figure 7:
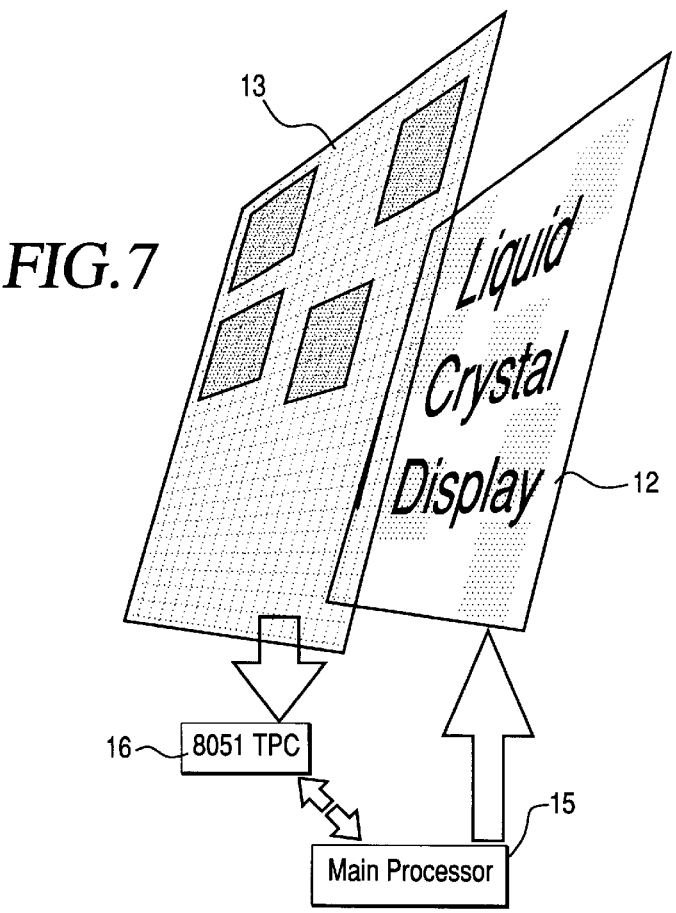
FIGS. 7 and 8 are pictorial diagrams illustrating features of this invention.

FIG. 7 illustrates that if a command error is detected, one way to deal with this is to define a prearranged set of hots spots like the four shown on touch pad 13 and touch pad controller 16 thereafter refuses further data entry commands. Service personnel can clear this error by use of the four defined hot spots and return the system to normal functioning after checking to determine the reason for the error.

Other approaches to command error processing might involve:
1. limiting the number of hot spots 13A accepted to a number that would be far less than required for any possible PIN entry or entry of any other sensitive data, at which point the application program would stop functioning in any reasonable manner.
2. erase encryption keys and shut off all functioning of touch pad controller 16 to force return of the unit to the factory for diagnosis and resetting after determining the reason for the command security breach.

It should be understood that this invention is not limited to any particular command error processing function.

ALTERNATIVE TO COMMAND ERROR PROCESSING

Figure 5C:
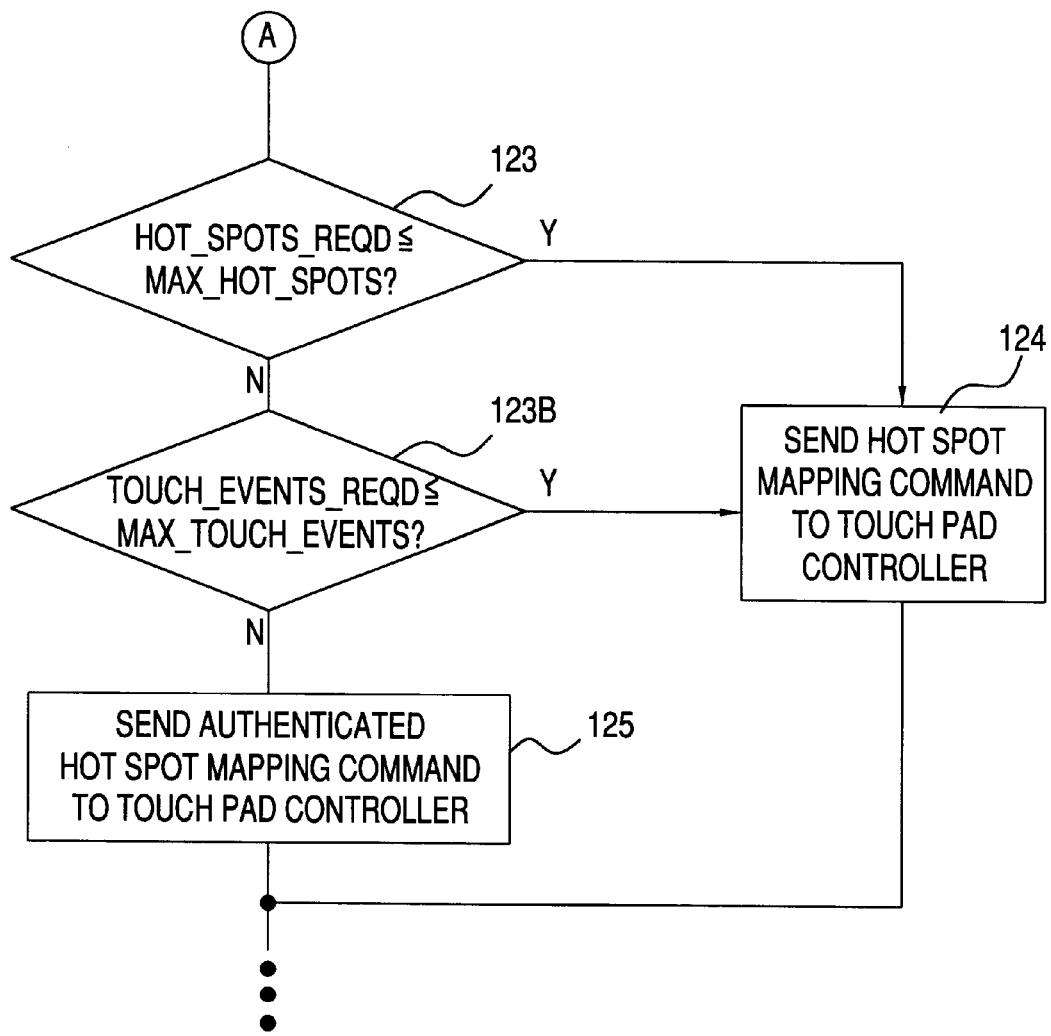
Figure 6C:
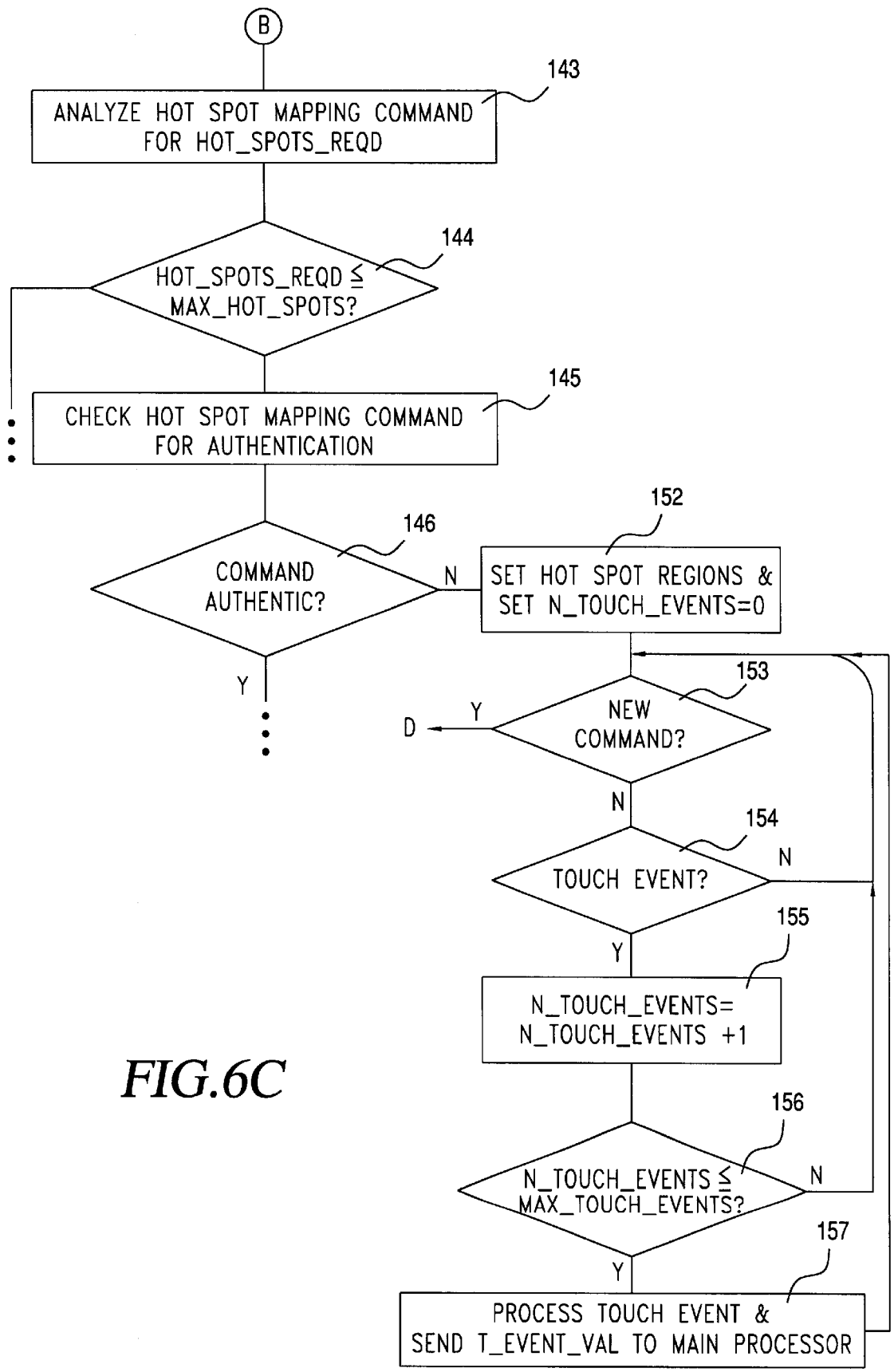

FIGS. 5C and 6C illustrate an alternative method of this invention which allows the application processor to define a number of hot spots greater than the maximum number allowed provided that the number of touch events to be processed is less than a defined maximum number of touch events, e.g. less than the number of touch events required for entry of a defined minimum number of digits of a PIN code, e.g. four digits. In other words, security is maintained by limiting the touch event messages returned to less than four in such a case, and in some cases, just one touch event would be allowed.

FIG. 5C shows that if step 123 returns NO, step 123B is executed to determine if the number of touch events required is less than or equal to the maximum number of touch events allowed in a case where the maximum number of hot spots is exceeded in the command. If step 123B returns YES, then step 124 is executed. Otherwise an authenticated command must be sent in step 125. Correspondingly, in FIG. 6C, step 146 checks for command authentication in a case where the number of hot spots required is greater than the maximum number permitted, but if there is no authenticated command, a hot spot error is not declared as it was in FIG. 6B. Instead, the hot spot regions are set as defined in the command in step 152, but a limited number of touch events are allowed by the following processing steps. Step 153 checks for a new command and goes off to point D if YES. Step 154 checks for a touch event, and if YES, increments the N TOUCH EVENTS parameter by 1. Step 156 then checks to see if the value of N_TOUCH_EVENTS is less than or equal to a defined MAX_TOUCH_EVENTS. If YES, then the touch event is processed and a touch event message (T_EVENT_VAL) is sent to the main processor. If NO, then execution returns to checking for a new command and no further touch events will be processed until a new command is received.

From the foregoing description of embodiments of this invention, it should be apparent that use of hot spots together with a touch pad controller and associated security chip provides security of data entry on a touch pad without the touch pad controller having any control over the contents of screens displayed on the associated LCD screen. Limiting the number of defined hot spots to less than the number required for PIN entry unless the command is authenticated prevents a rogue application from surreptitiously obtaining PIN data in the clear. PIN entry can only be achieved by issuing an ENTER_PIN command to the touch pad controller from the main processor.

Alternatively, limiting the number of touch events associated with any hot spot definition command similarly prevents a rogue application from surreptitiously obtaining PIN data in the clear. In this case, the rogue application could try to obtain PIN data buy sequential commands, but the average intelligent person will not enter his PIN data in response to such a radically different set of data entry screen messages.

It should be understood that touch pad controller 16 may also be programmed to respond to other special commands by accepting numeric data and returning only encrypted data.

Persons of skill in the art will appreciate that numerous other modifications to the apparatus and method described above could be made without departing from the scope of this invention as defined in the following claims.

What is claimed is:

1. A method for operating a combination touch pad and display screen device, wherein:

said touch pad is controlled by a touch pad controller and said display screen is controlled by an application program processor in communication with said touch pad controller and said display screen, said touch pad controller and application program processor being situated within a physically secured transaction terminal, said application program processor being arranged to allow unknown application programs to be downloaded into the terminal and executed, and said touch pad controller being pre-programmed so that it is not subject to programming by downloading unknown application programs into the terminal, said method comprising the steps of:

a. said application program processor displaying on said display screen a set of functional components;
   b. defining a plurality of touch pad hot spots corresponding in area and location to said functional components;
   c. said touch pad controller sensing a touch event on said touch pad;
   d. said touch pad controller comparing coordinates of said touch event with coordinates of said touch pad hot spots corresponding to said functional components; and
   e. if said touch coordinates correspond to coordinates of one of said touch pad hot spots, said touch pad controller sending to said application program processor a touch event message identifying the touch pad hot spot corresponding to said touch event, and wherein a rogue program downloaded to said application program processor is precluded from access to said touch coordinates.

2. The method of claim 1, wherein said combination of touch pad controller and display screen device are operated as a secured data entry device in a point-of-sale transaction environment in which secret PIN entries are required, and said touch pad controller is a separate hardware unit which includes an associated security processor and is located within a security module for protection against intrusion, said method further comprising the steps of:

said application processor displaying on said display screen device a set of said functional components comprising a PIN data entry screen comprising at least a set of data entry buttons corresponding to PIN numerals and an "ENTER" command button;

said application processor sending to said touch pad controller a special PIN data entry command differing from said hot spot command and requesting execution by said touch pad controller of a PIN entry touch event routine;

said touch pad controller responding to said PIN data entry command by executing the steps of:
   defining a prearranged set of hot spots corresponding to active data entry and command buttons in said PIN data entry screen;
   responding to a sequence of touch events corresponding to active data entry buttons by storing each of the associated PIN numerals; and
   responding to a touch event corresponding to said "ENTER" command button by encrypting said stored PIN numerals using said security processor to produce encrypted PIN data and sending said encrypted PIN data to said application processor.

3. The method of claim 2, further comprising the steps of:

said touch pad controller responding to a hot spot command received from said application processor by determining if the number of said plurality of hot spots defined in said hot spot command is less than or equal to a predetermined hot spot limit less than the number of hot spots required for PIN entry;

if said determining step is positive, said touch pad controller directly executing said hot spot command by responding to each hot spot touch event and sending a corresponding touch event message to said application processor; and if said determining step is negative, said touch pad controller declaring a hot spot command error and processing a hot spot error routine.

4. The method of claim 2, further comprising the steps of:

said touch pad controller responding to a hot spot command received from said application processor by determining if the number of said plurality of hot spots defined in said hot spot command is less than or equal to a predetermined hot spot limit less than the number of hot spots required for PIN entry;

if said determining step is positive, said touch pad controller directly executing said hot spot command by responding to hot spot touch events and sending corresponding touch event messages to said application processor; and if said determining step is negative, said touch pad controller next determining if said hot spot command passes a set of prearranged command authentication tests, and executing said hot spot command if and only if said hot spot command passes said set of authentication tests.

5. The method of claim 4, further comprising the steps of:

said touch pad controller declaring a hot spot command error if said hot spot command fails said set of command authentication tests and then processing a hot spot error routine comprising the steps of:
   defining a prearranged set of error clearance hot spots less than said predetermined hot spot limit;
   refusing to execute subsequent hot spot commands received from said application processor until a predefined sequence of touch events on said error clearance hot spots is received.

6. The method of claim 1, wherein said touch pad and said display screen are both controlled by an application processor comprising a touch pad controller module for controlling said touch pad and an application program processing module for executing application program commands including commands for displaying functional components on said display screen, and wherein said step a. is carried out by said application program processing module displaying on said display screen a set of functional components;

said step b. is carried out by said application program processing module sending to said touch pad controller module a hot spot command defining a plurality of touch pad hot spots corresponding in area and location to said set of functional components;

said step c. is carried out by said touch pad controller module sensing a touch event on said touch pad corresponding to one of said touch pad hot spots and sending to said application program processing module a touch event message identifying the touch pad hot spot corresponding to said touch event.

7. The method of claim 6, wherein said combination touch pad and display screen device are operated as a secured data entry device in a point-of-sale transaction environment in which secret PIN entries are required, and said touch pad controller module has an associated PIN encryption module, said method further comprising the steps of:

said application program processing module displaying on said display screen device a set of said functional components comprising a PIN data entry screen comprising at least a set of data entry buttons corresponding to PIN numerals and an "ENTER" command button;

said application program processing module sending to said touch pad controller module a special PIN data entry command differing from said hot spot command and requesting execution by said touch pad controller module of a PIN entry touch event routine;

said touch pad controller module responding to said PIN data entry command by executing the steps of:

defining a prearranged set of hot spots corresponding to active data entry and command buttons in said PIN data entry screen;

responding to a sequence of touch events corresponding to active data entry buttons by storing each of the associated PIN numerals; and responding to a touch event corresponding to said "ENTER" command button by encrypting said stored PIN numerals using said PIN encryption module to produce encrypted PIN data and sending said encrypted PIN data to said application program processing module.

8. The method of claim 7, further comprising the steps of:

said touch pad controller module determining if the number of said plurality of hot spots defined in said hot spot command is less than or equal to a predetermined hot spot limit less than the number of hot spots required for PIN entry;

if said determining step is positive, said touch pad controller module directly executing said hot spot command by responding to each hot spot touch event and sending a corresponding touch event message to said application program processing module; and if said determining step is negative, said touch pad controller declaring a hot spot command error and processing a hot spot error routine.

9. The method of claim 7, further comprising the steps of:

said touch pad controller module determining if the number of said plurality of hot spots defined in said hot spot command is less than or equal to a predetermined hot spot limit less than the number of hot spots required for PIN entry;

if said determining step is positive, said touch pad controller module directly executing said hot spot command by responding to hot spot touch events and sending corresponding touch event messages to said application program processing module; and if said determining step is negative, said touch pad controller module next determining if said hot spot command passes a set of prearranged command authentication tests, and executing said hot spot command if and only if said hot spot command passes said set of authentication tests.

10. The method of claim 9, further comprising the steps of:

said touch pad controller module declaring a hot spot command error if hot spot command fails said set of command authentication tests and then processing a hot spot error routine comprising the steps of:

defining a prearranged set of error clearance hot spots less than said predetermined hot spot limit;

refusing to execute subsequent hot spot commands received from said application program processing module until a predefined sequence of touch events on said error clearance hot spots is received.

11. Data entry apparatus, comprising, in combination:

a display screen device;

a touch pad mounted over said display screen device;

a touch pad controller coupled to said touch pad; and an application processor coupled to said touch pad controller and to said display screen device;

said application processor comprising:

means for displaying on said display screen a predefined data entry screen having a prearranged set of functional components; and means for sending to said touch pad controller a hot spot command defining a plurality of touch pad hot spots corresponding in area and location to said set of functional components;

said touch pad controller comprising:

means for sensing a touch event on said touch pad corresponding to one of said touch pad hot spots;

means for comparing said coordinates of said touch event with coordinates of said touch pad hot spots corresponding to said functional components; and means for, if said touch coordinates correspond to coordinates of one of said touch pad hot spots, sending to said application processor a touch event message identifying the touch pad hot spot corresponding to said touch event, wherein said touch pad controller and application program processor are situated within a physically secured transaction terminal, said application program processor being arranged to allow unknown application programs to be downloaded into the terminal and executed, and said touch pad controller being pre-programmed so that it is not subject to programming by downloading unknown application programs into the terminal, and wherein a rogue program downloaded to said application program processor is precluded from access to said touch coordinates.

12. Apparatus as claimed in claim 11, adapted to operate as a secured data entry device in a point-of-sale transaction environment in which secret PIN entries are required, and further comprising:

a security processor operatively associated with said touch pad controller, a security module housing said touch pad controller and said security processor for protection against physical intrusion;

said application processor further including

PIN entry command means for displaying on said display screen device a set of functional components in the form of a PIN data entry screen comprising at least a set of data entry buttons corresponding to PIN numerals and an "ENTER" command button and for sending to said touch pad controller a PIN data entry command requesting execution of a PIN entry touch event routine;

said touch pad controller being preprogrammed with a PIN entry touch routine including:

means defining a prearranged set of hot spots corresponding to active data entry and command buttons in said PIN data entry screen;

means for receiving a PIN data entry command from said application processor and thereafter responding to a sequence of touch events corresponding to active data entry buttons by storing each of the associated PIN numerals;

means responsive to a touch event corresponding to said "ENTER" command button for sending said stored PIN numerals to said security processor for encryption therein and for sending the resulting encrypted PIN data to said application processor.

13. Apparatus as claimed in claim 12, wherein said touch pad controller further includes means for determining if the number of hot spots defined in a hot spot command is less than or equal to a predetermined hot spot limit which is less than the number of hot spots required for PIN entry;

and wherein said touch pad controller directly executes said hot spot command and returns touch event messages to said application processor only if said number of hot spots defined in said hot spot command is less than or equal to said predetermined hot spot limit.

14. Apparatus as claimed in claim 12, wherein said application processor includes a stored application program comprising a set of hot spot commands which define a number of hot spots greater than said predetermined hot spot limit and which include command authentication data elements; and said touch pad controller includes means for testing the authenticity of a received hot spot command based on said command authentication data elements therein;

and wherein said touch pad controller executes a hot spot command which includes a number of defined hot spots greater than said predetermined hot spot limit only if said means for testing authenticates said hot spot command.

* * * * *